(12) United States Patent
Patel et al.

(10) Patent No.: US 10,289,501 B2
(45) Date of Patent: *May 14, 2019

(54) STORAGE AGGREGATE RESTORATION

(71) Applicant: NetApp Inc., Sunnyvale, CA (US)

(72) Inventors: Chaitanya V. Patel, Orange, CA (US); Laurent Nicolas Lambert, Santa Cruz, CA (US); Linda Ann Riedle, Cary, NC (US); Sandeep T. Nirmale, Santa Clara, CA (US)

(73) Assignee: NetApp Inc., Sunnyvale, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/468,896

(22) Filed: Mar. 24, 2017

(65) Prior Publication Data
US 2017/0199793 A1     Jul. 13, 2017

Related U.S. Application Data

(63) Continuation of application No. 14/220,787, filed on Mar. 20, 2014, now Pat. No. 9,619,352.

(51) Int. Cl.
*G06F 3/06*     (2006.01)
*G06F 11/16*     (2006.01)
*G06F 11/20*     (2006.01)

(52) U.S. Cl.
CPC .......... *G06F 11/1662* (2013.01); *G06F 3/065* (2013.01); *G06F 3/0619* (2013.01);
(Continued)

(58) Field of Classification Search
CPC ............. G06F 11/2023; G06F 11/5072; G06F 11/2046; G06F 11/2025; G06F 11/2033
See application file for complete search history.

(56) References Cited

U.S. PATENT DOCUMENTS 7,111,194 B1    9/2006    Schoenthal et al.
2007/0078986 A1*   4/2007    Ethier ................. H04L 65/1069
                                                          709/227
(Continued)

OTHER PUBLICATIONS

Non-Final Office Action cited in U.S. Appl. No. 14/220,787 dated Jan. 11, 2016, 12 pgs.
(Continued)

*Primary Examiner* — Jigar P Patel
(74) *Attorney, Agent, or Firm* — Cooper Legal Group, LLC

(57) ABSTRACT

One or more techniques and/or systems are provided for controlling restoration of a storage aggregate. For example, a local storage device, located at a first storage site, and a remote storage device, located at a second storage site, may be assigned to a first storage aggregate. Responsive to a disaster of the first storage site, a gate may be created for the local storage device. The gate may block automated reconstruction and/or automated synchronization that may otherwise occur with respect to the local storage device. Until the local storage device is restored, the remote storage device may be used to service I/O requests that were otherwise directed to the local storage device. Responsive to receiving a user restoration command, the gate may be removed from the local storage device. Synchronization between the local storage device and the remote storage device may then be facilitated.

20 Claims, 11 Drawing Sheets

(52) U.S. Cl.
CPC ........ *G06F 3/0683* (2013.01); *G06F 11/2071* (2013.01); *G06F 11/2082* (2013.01); *G06F 11/2092* (2013.01)

(56) References Cited

U.S. PATENT DOCUMENTS

2011/0225123 A1* 9/2011 D'Souza ........... G06F 17/30312
                                                        707/634
2014/0047263 A1* 2/2014 Coatney .............. G06F 11/2023
                                                        714/4.11

OTHER PUBLICATIONS

Reply Non-Final Office Action cited in U.S. Appl. No. 14/220,787 dated Jan. 28, 2016, 13 pgs.
Final Office Action cited in U.S. Appl. No. 14/220,787 dated May 11, 2016, 16 pgs.
Reply Final Office Action cited in U.S. Appl. No. 14/220,787 dated May 24, 2016, 12 pgs.
Advisory Action cited in U.S. Appl. No. 14/220,787 dated Jun. 17, 2016, 3 pgs.
Notice of Allowance cited in U.S. Appl. No. 14/220,787 dated Dec. 2, 2016, 11 pgs.

* cited by examiner

STORAGE AGGREGATE RESTORATION

RELATED APPLICATION

This application claims priority to and is a continuation of U.S. patent application Ser. No. 14/220,787, filed on Mar. 20, 2014 and titled "STORAGE AGGREGATE RESTORATION," which is incorporated herein by reference.

BACKGROUND

A network storage environment may comprise one or more storage controllers configured to provide client devices with access to data stored on storage devices accessible from the respective storage controllers.

DETAILED DESCRIPTION

Figure 1:
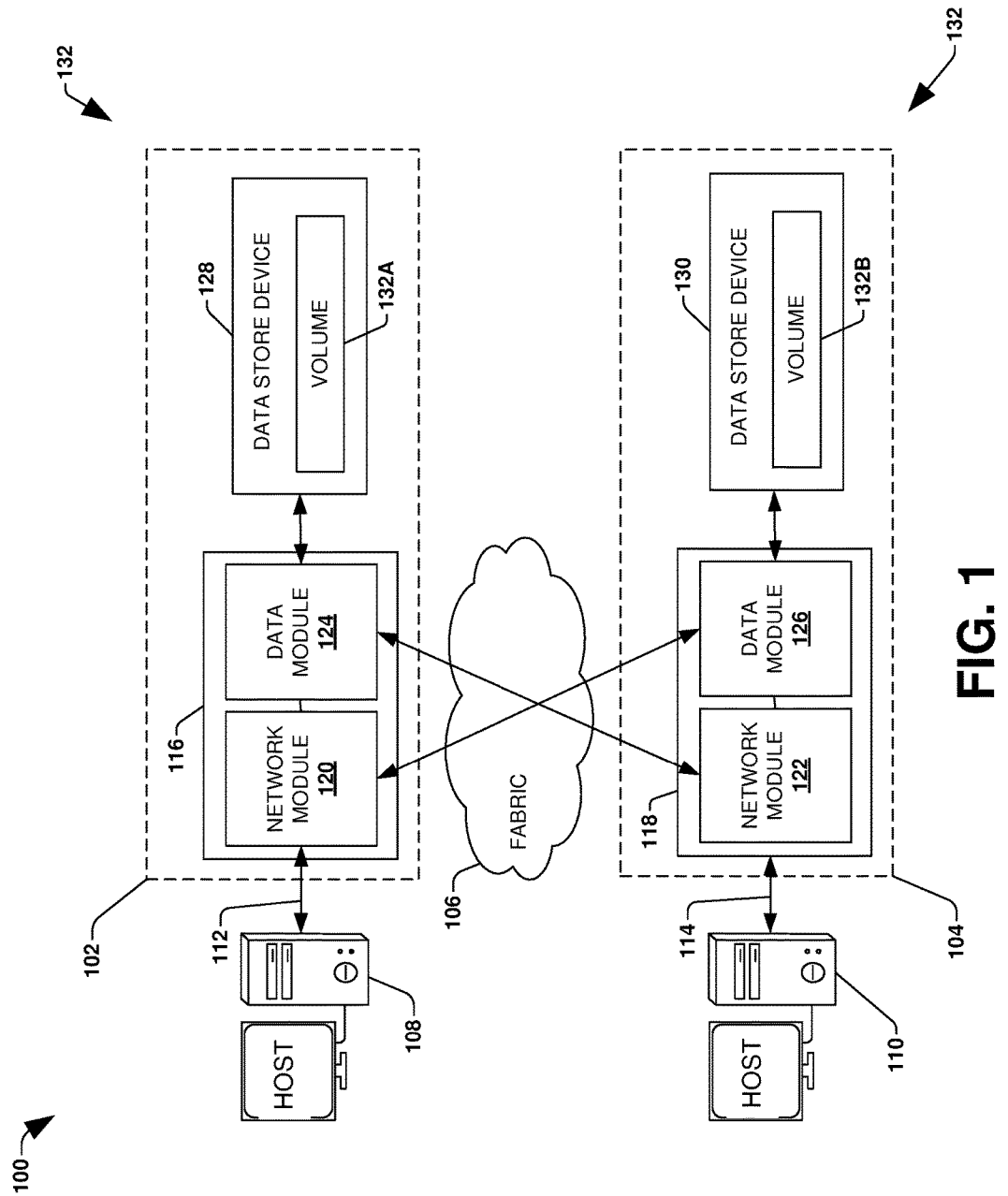
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for controlling restoration of a storage aggregate are provided. Within a network storage environment, a first set of storage controllers are located at a first or local storage site (e.g., a first location such as a first city) and a second set of storage controllers are located at a second or remote storage site (e.g., a second location such as a second city). The first set of storage controllers may manage a first storage aggregate (e.g., a logical grouping of storage devices that may be assigned to or owned by the first set of storage controllers) and the second set of storage controllers may manage a second storage aggregate (e.g., a logical grouping of storage devices that may be assigned to or owned by the second set of storage controllers). A local storage device associated with the first storage aggregate, and thus managed by the first set of storage controllers at the first storage site, may be located at the first storage site and a remote storage device associated with the first storage aggregate, and thus also managed by the first set of storage controllers at the first storage site, may be located at the second storage site. Data may be mirrored from the local storage device to the remote storage device for disaster recovery and/or switchover operation. If a disaster associated with the first storage site occurs, then the second set of storage controllers at the second storage site may take over the remote storage device for switchover operation so that the second set of storage controllers may provide data access to the first storage aggregate utilizing the data mirrored to the remote storage device from the local storage device. In this way, disaster recovery and/or continued access to data may be provided. When the disaster at the first storage site is resolved, the local storage device is restored at the first storage site. As provided herein, a gate may be created for the local storage device during switchover of the remote storage device to the second set of storage controllers when the first storage site has a disaster and/or during restoration of the local storage device at the first storage site when the disaster at the first storage site is resolved.

In an example of a gate, the gate may block automated reconstruction of the local storage device and/or other local storage devices, which may mitigate unnecessary reconstruction of local storages devices during restoration of the first storage site. For example, a first local storage device may be recognized as being paired with a second local storage device. During restoration of the first storage site, the first local storage device may come online before the second local storage device (e.g., an administrator may power on the first local storage device, and may then proceed to power on the second local storage device). Without the gate, automatic reconstruction of the second local storage device may occur (e.g., based upon a determination that the first local storage device is online and that the second local storage device is not online), which may be unnecessary because the second local storage device may come online shortly after the first local storage device (e.g., once the administrator powers on the second local storage device). In this way, gates are created for local storage devices so that the local storage devices are concurrently brought online (e.g., based upon a user restoration command issued by the administrator after the administrator is finished powering on the local storage devices).

In another example of a gate, the gate may block automated synchronization of the local storage device using the remote storage device. Without the gate, automated synchronization may overwrite the local storage device with data from the remote storage device, however, the data within the local storage device may be preferred over the data from the remote storage device (e.g., even though the local storage device may have been offline for a while). In this way, the gate may block the automated synchronization until a user restoration command comprising a user designation of a synchronization template is received, for example. For example, once the first storage site is restored, storage device synchronization may be performed based upon the user designation of either the local storage device or the remote storage device as the synchronization template (e.g., the administrator may specify whether local storage devices are to be synchronized based upon remote storage devices or whether remote storage devices are to be synchronized based upon local storage devices).

To provide context for controlling restoration of a storage aggregate, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 a Disk Module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second Disk Module 126 of a second node 118.

Disk Modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, Disk Modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the Network Module 120 in the node 116 within data storage system 102. The node 116 can forward the data to the data storage device 128 using the Disk Module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the Network Module 122 in the host 118 within the data storage system 104 (e.g., which may be remote from the data storage system 102). The host 118 can forward the data to the data storage device 130 using the Disk Module 126, thereby accessing volume 132B associated with the data storage device 130.

It may be appreciated that storage aggregate restoration may be implemented within the clustered network environment 100. For example, a gate component may be implemented for the data storage device 128 and/or the data storage device 130. The gate component may be configured to create a gate for the data storage device 128 and/or the data storage device 130. The gate may block automated reconstruction of a data storage device and/or may block automated synchronization of a storage device. In this way, data storage devices may be concurrently brought online during disaster recovery (e.g., recovery of the data storage system or storage site 102 and/or the data storage system or storage site 104) and a user, such as an administrator, may selectively choose what data storage devices to use as synchronization templates.

Figure 2:
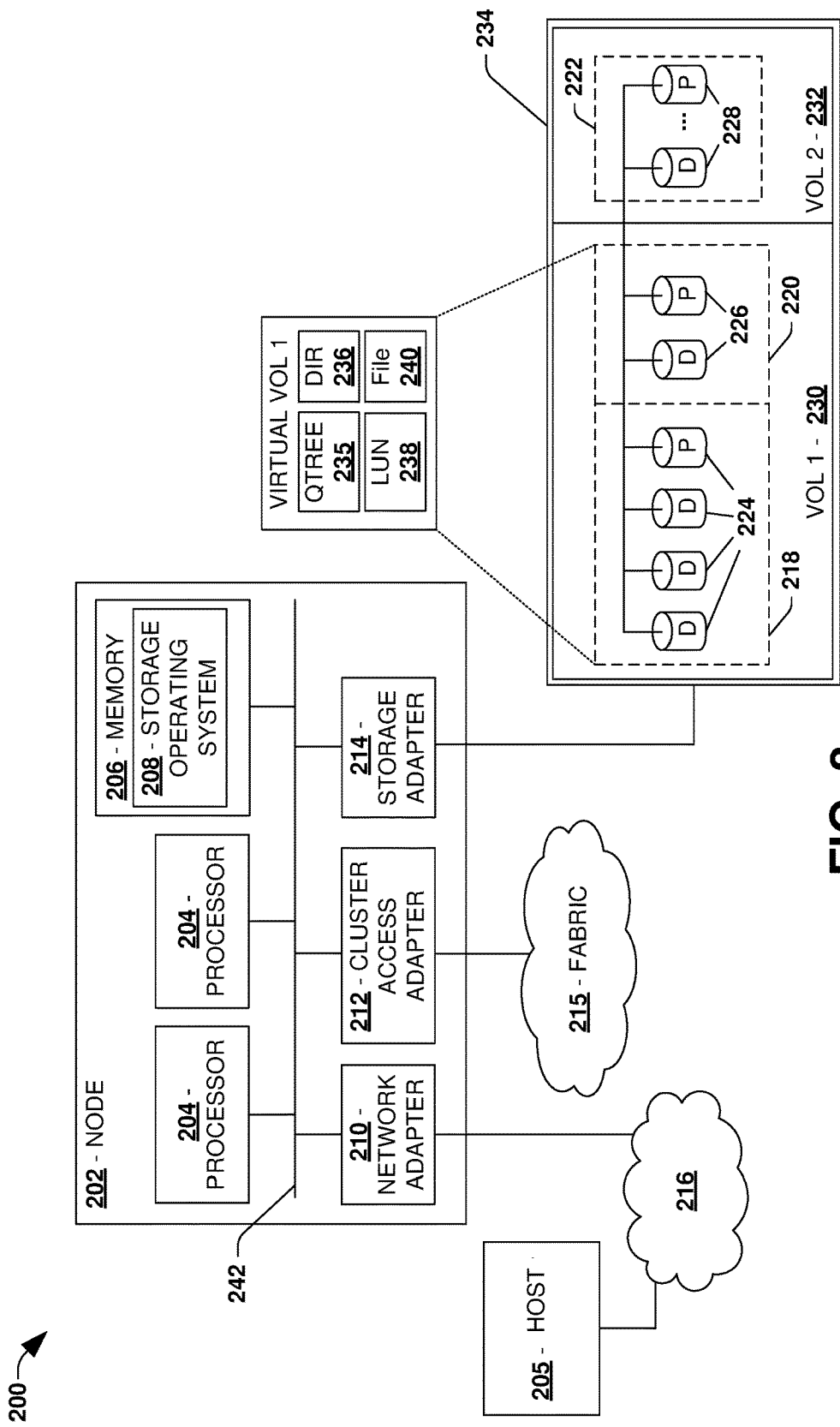
FIG. 2 is a component block diagram illustrating an example data storage system in accordance with one or more of the provisions set forth herein.

FIG. 2 is an illustrative example of a data storage system or storage site 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that storage aggregate restoration may be implemented for the data storage system or storage site 200. For example, a gate component may be implemented for the data storage device 234. The gate component may be configured to create a gate for the data storage device 234. The gate may block automated reconstruction of the data storage device 234 and/or may block automated synchronization of the data storage device 234. In this way, the data storage device 234 may be concurrently brought online with other data storage devices during disaster recovery (e.g., recovery of the data storage system or storage site 200) and a user, such as an administrator, may selectively choose what data storage devices to use as synchronization templates.

Figure 3:
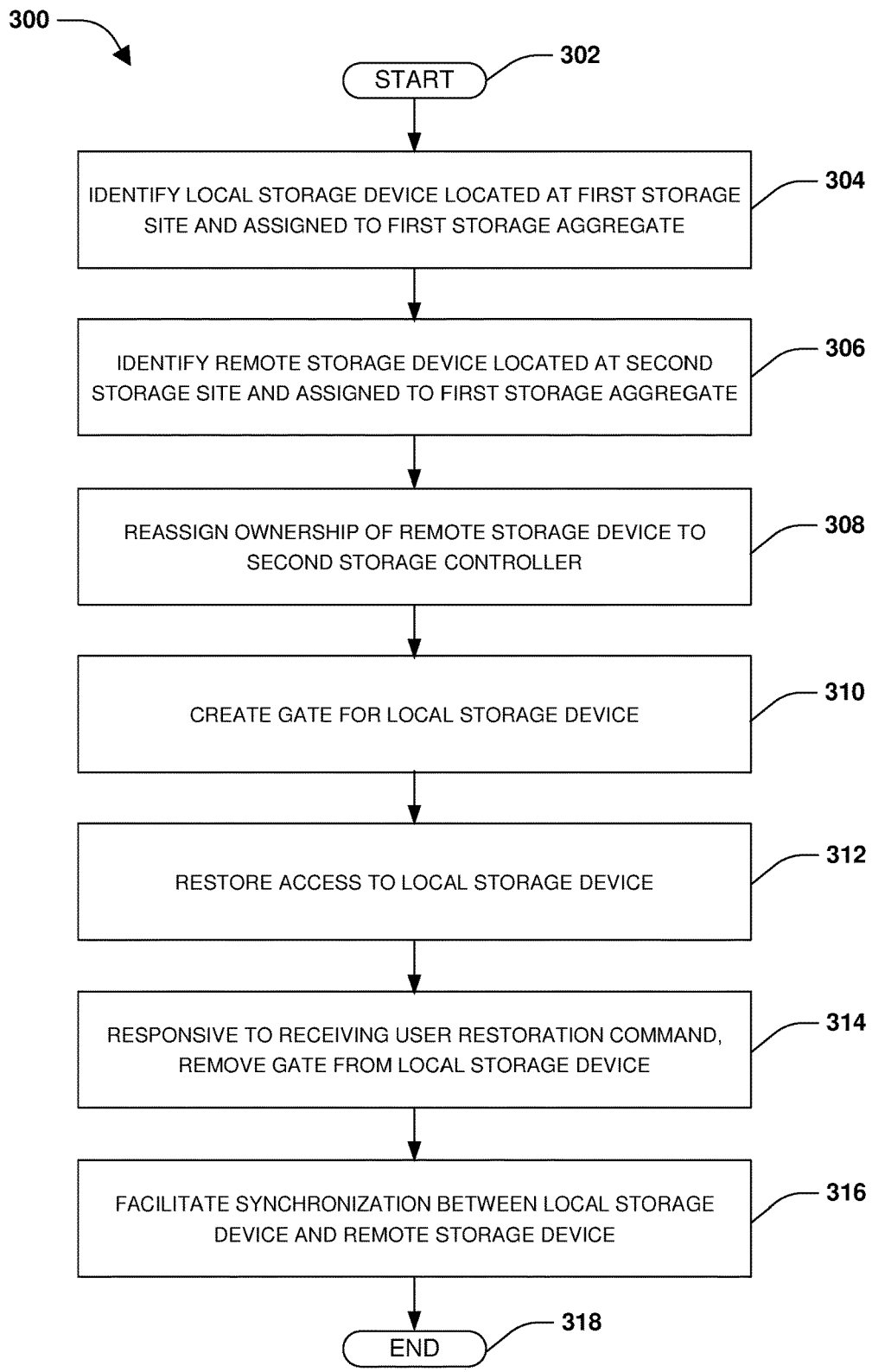
FIG. 3 is a flow chart illustrating an exemplary method of controlling restoration of a storage aggregate.

One embodiment of controlling restoration of a storage aggregate is illustrated by an exemplary method 300 of FIG. 3. At 302, the method starts. At 304, a local storage device located at a first storage site may be identified. The local storage device may be assigned to a first storage aggregate. In an example, one or more storage controllers at the first storage site (e.g., a first cluster), such as a first storage controller and a second storage controller, may provide I/O access to data stored within the first storage aggregate. In an example, one or more additional local storage devices may be located at the first storage site and are assigned to the first storage aggregate, such as a second local storage device (e.g., having a raid configuration or other backup configuration with respect to the local storage device).

At 306, a remote storage device located at a second storage site may be identified. The remote storage device is assigned to the first storage aggregate. The remote storage device and the local storage device may be configured according to a data pairing configuration (e.g., a high availability configuration) for the first storage aggregate (e.g., data may be mirrored from the local storage device to the remote storage device so that the remote storage device may be used for switchover operation in place of the local storage device in the event a failure of the local storage device occurs). In an example, one or more storage controllers at the second storage site (e.g., a second cluster), such as a third storage controller and a fourth storage controller, may provide I/O access to data stored within one or more storage devices assigned to a second storage aggregate. Storage controllers at the second storage site and storage controllers at the first storage site may be configured according to a disaster recovery configuration such that when a disaster of the first storage site occurs, the third storage controller and/or the fourth storage controller may provide client devices with switchover data access to the first storage aggregate using mirrored data within the remote storage device assigned to the first storage aggregate.

In an example, a disaster of the first storage site may be identified (e.g., a power outage of a building/location comprising the first storage site, which may not result in a disaster of the second storage site remotely located in a different building/location). At 308, ownership of the remote storage device may be reassigned from a storage controller at the first storage site to a storage controller at the second storage site (e.g., the third storage aggregate and/or the fourth storage aggregate may take ownership of the remote storage device). That is, the first storage controller and the second storage controller may be affected by the disaster of the first storage site, and thus may be unable to provide access to data within the local storage device. However, the third storage controller and/or the fourth storage controller, located at the second storage site, may be unaffected by the disaster, and thus may take ownership of the remote storage device for switchover operation in order to provide I/O access to the mirrored data within the remote storage device. In this way, data access may be provided to the remote storage device (e.g., by the third storage controller and/or the fourth storage controller based upon the reassignment of ownership).

At 310, a gate may be created for the local storage device. In an example, the gate may be created during the switchover of the remote storage device to the storage controllers at the second storage site. In an example of creating the gate, a storage device assignment manager (e.g., a storage area network (SAN) ownership layer configured to facilitate automated reconstruction and/or automated synchronization during disaster recovery) may be instructed to ignore the local storage device, such that the local storage device is not exposed to one or more storage layers that may otherwise perform automated reconstruction and/or automated synchronization.

In an example, the gate blocks automated reconstruction associated with the local storage device. For example, automated reconstruction may be a mechanism that identifies local storage devices having a logical association (e.g., the local storage device and the second local storage device may both be assigned to the first storage aggregate and/or may have a raid configuration or other backup configuration). If the automated reconstruction determines that one of the local storage devices of the logical association is online and another is offline, then the automated reconstruction may reconstruct/rebuild the offline local storage device (e.g., based upon an assumption that the offline local storage device has failed). Thus, if the gate was not created for the local storage device and the second local storage device is brought online before the local storage device (e.g., an administrator may first power on the second local storage device during recovery of the first storage site, and may then proceed to power on the local storage device after the second local storage device has been powered on), then the automated reconstruction would begin reconstructing the local storage device even though the local storage device will be momentarily brought online by the administrator after the second local storage device. In this way, gates may be created for the local storage device, the second local storage device, and/or other local storage devices so that such local storage devices are concurrently brought online, which may mitigate unnecessary automated reconstruction otherwise occurring due to bringing local storage devices online in a staggered manner.

In another example, the gate blocks automated synchronization of the local storage device using the remote storage device. For example, automated synchronization may be a mechanism that automatically overwrites the local storage device with data from the remote storage device (e.g., based upon an assumption that the remote storage device has relatively more recent data due to the third storage controller and/or the fourth storage controller using the remote storage device for switchover operation where new data may be written to the remote storage device). However, data within the local storage device may be preferred over data within the remote storage device (e.g., based upon a prior disconnection between the first storage site and the second storage site resulting in the local storage device comprising data that was never mirrored to the remote storage device). In this way, gates may be created for local storage devices so that an administrator may selectively determine whether to use the local storage device or the remote storage device as a synchronization template.

At 312, access to the local storage device and/or other local storage devices may be restored. In an example, a user restoration command may be received for the first storage site, such as for restoration of the first storage controller, the second storage controller, and/or the first storage aggregate associated with the first storage site. At 314, the gate may be removed from the local storage device. In an example, gates may be concurrently removed from the local storage device and/or other local storage devices, which may mitigate unnecessary automated reconstruction of local storage devices that may otherwise occur from bringing local storage devices online in a staggered manner. In an example of removing the gate, a storage device assignment manager may be instructed to expose the local storage device to one or more storage layers (e.g., to resume normal access, management, and/or operation associated with the local storage device).

At 316, synchronization may be facilitated between the local storage device and the remote storage device. In an example, responsive to the local storage device being designated as the synchronization template, the remote storage device may be synchronized based upon the synchronization template. Responsive to the remote storage device being designated as the synchronization template, the local storage device may be synchronized based upon the synchronization template.

In an example, the first storage aggregate at the first storage site may be restored. Ownership of the remote storage device and/or the local storage device may be (re)assigned to storage controllers at the first storage site. In this way, the first storage aggregate may be restored so that the first storage controller and/or the second storage controller may retake ownership of and/or provide data access to the first storage aggregate, such as the local storage device. At 318, the method ends.

Figure 4A:
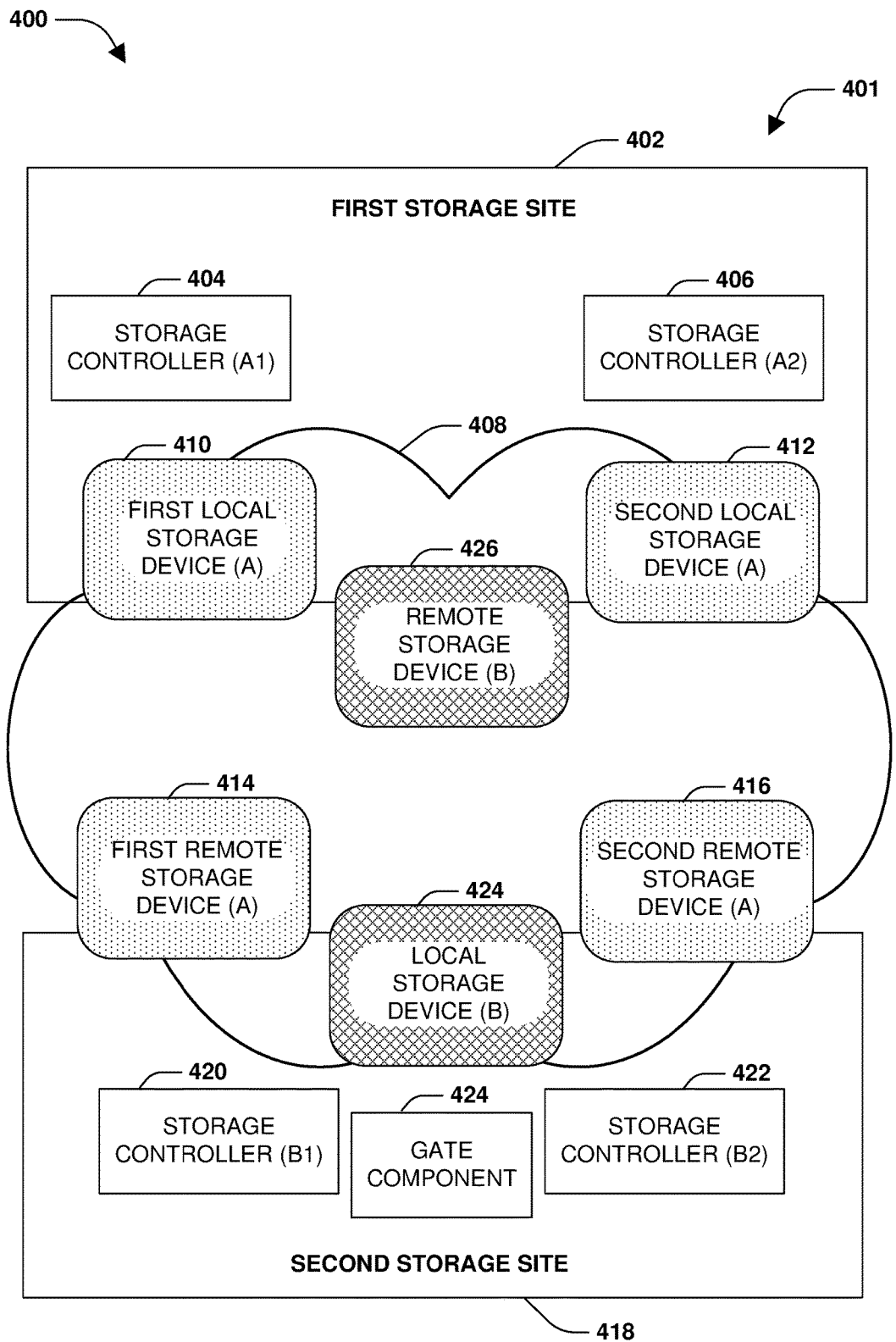
FIG. 4A is an example of a first storage site comprising a storage controller (A1) and a storage controller (A2).

FIGS. 4A-4G illustrate examples of a system 401, comprising a gate component 424, for controlling restoration of a storage aggregate. FIG. 4A illustrates an example 400 of a first storage site 402 comprising a storage controller (A1) 404 and a storage controller (A2) 406. The storage controller (A1) 404 and/or the storage controller (A2) 406 may provide data access to a storage aggregate (A) associated with a first local storage device (A) 410, a second local storage device (A) 412, a first remote storage device (A) 414, and a second remote storage device (A) 416. The first local storage device (A) 410 and the second local storage device (A) 412 may be located at the first storage site 402. The first remote storage device (A) 414 and the second remote storage device (A) 416 may be located at a second storage site 418. The second storage site 402 comprises a storage controller (B1) 420 and a storage controller (B2) 422 that are configured to provide data access to a storage aggregate (B) associated with a local storage device (B) 424 located at the second storage site 418 and a remote storage device (B) 426 located at the first storage site 402.

Figure 4B:
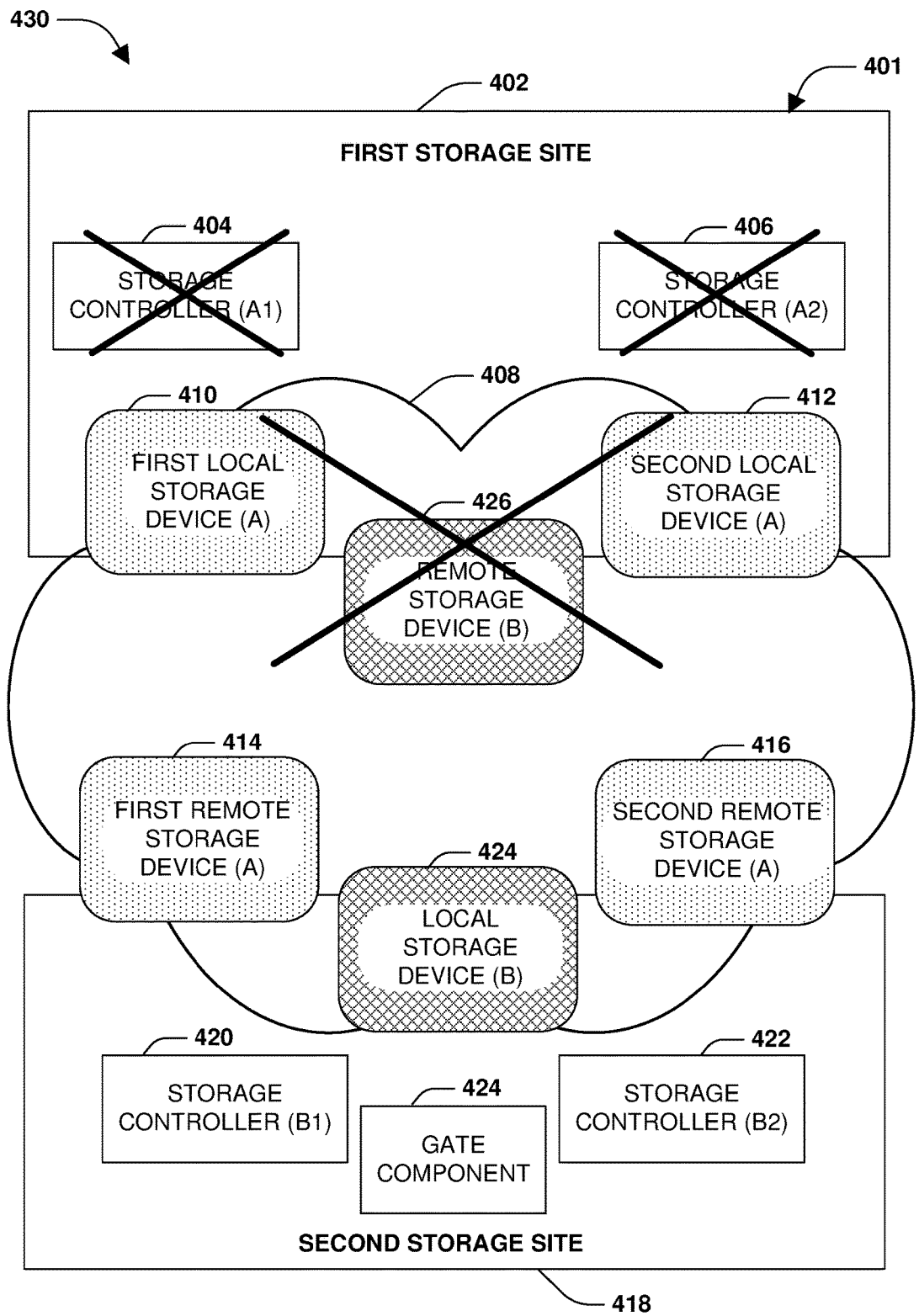
FIG. 4B is an example of identifying a disaster of a first storage site.

FIG. 4B illustrates an example 430 of identifying a disaster of the first storage site 402. In an example, the disaster affects availability of the storage controller (A1) 404, the storage controller (A2) 406, and/or access through the first storage site 402 to the first local storage device (A) 410, the second local storage device (A) 412, and/or the remote storage device (B) 426.

Figure 4C:
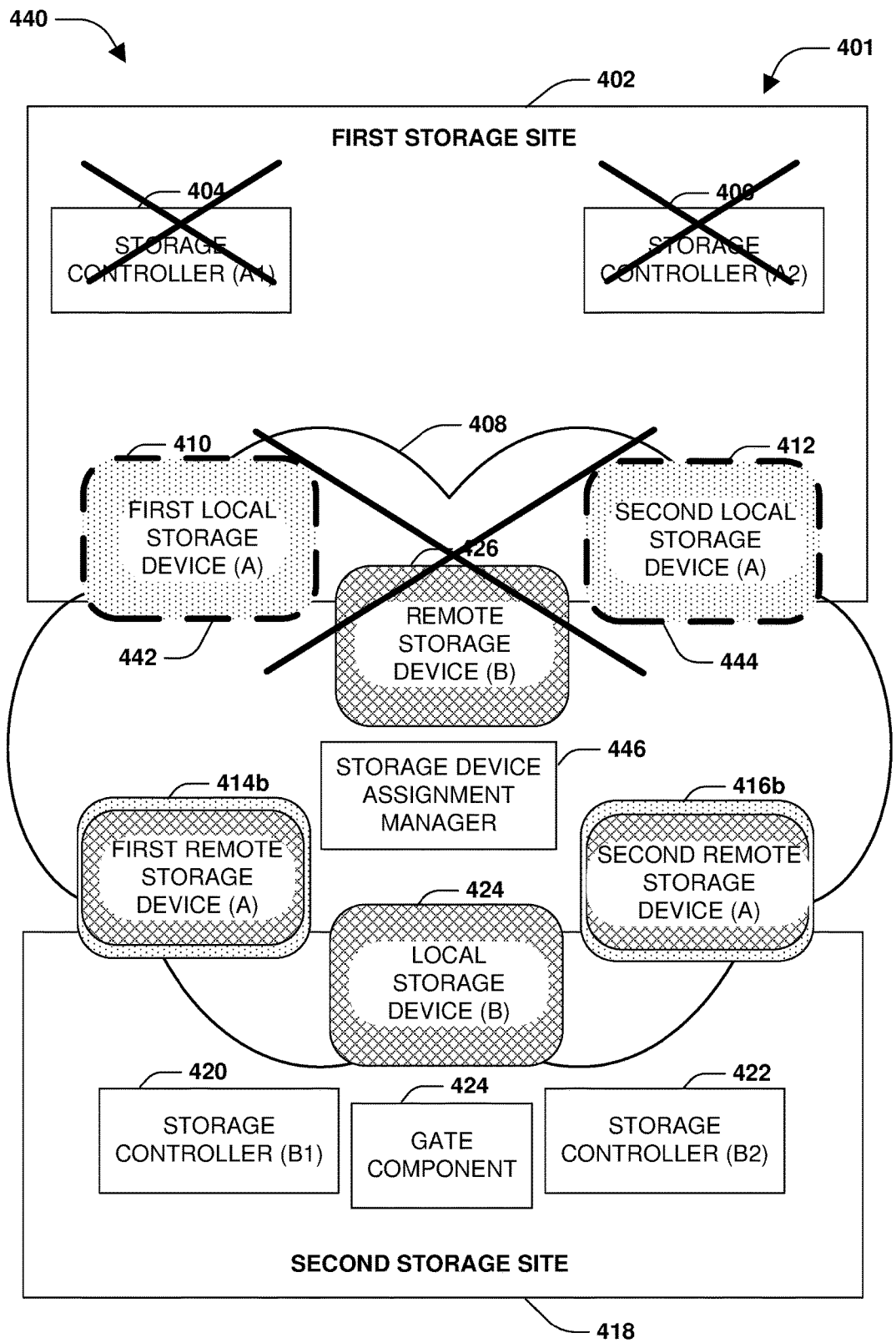
FIG. 4C is an example of a storage controller (B1) and/or a storage controller (B2) taking ownership of a first remote storage device (A) and/or a second remote storage device (A).

FIG. 4C illustrates an example 440 of the storage controller (B1) 420 and/or the storage controller (B2) 422 taking ownership of the first remote storage device (A) 414 and/or the second remote storage device (A) 416. For example, ownership of the first remote storage device (A) 414 is reassigned to the storage controller (B1) 420 resulting in the first remote storage device (A) 414b. Ownership of the second remote storage device (A) 416 is reassigned to the storage controller (B2) 422 resulting in the second remote storage device (A) 416b. In this way, the storage controller (B1) 420 and/or the storage controller (B2) 422 may provide switchover disaster recovery for the storage controller (A1) 404 and storage controller (A2) 406 by providing I/O access to data mirrored from the first local storage device (A) 410 to the first remote storage device (A) 414b and providing I/O access to data mirrored from the second local storage device (A) 412 to the second remote storage device (A) 416b.

In an example, the gate component 424 is configured to create a first gate 442 for the first local storage device (A) 410 and/or a second gate 444 for the second local storage device (A) 412. In another example, a single gate is created for the first local storage device (A) 410 and the second local storage device (A) 412. In an example, the gate component 424 may create the first gate 442 and/or the second gate 444 by instructing a storage device assignment manager 446 to ignore the first local storage device (A) 410 and/or the second local storage device (A) 412. In an example, the first gate 442 and/or the second gate 444 are configured to block automated reconstruction associated with the first local storage device (A) 410 and/or the second local storage device (A) 412. Blocking automated reconstruction may mitigate unnecessary reconstruction/recreation of local storage devices. For example, the second gate 444 may block automated reconstruction of the second local storage device (A) 412 that may otherwise occur when the first local storage device (A) 410 is brought online before the second local storage device (A) 412 is brought online (e.g., without the second gate 444, the automated reconstruction may start unnecessarily reconstructing the second local storage device (A) 412 after determining that the first local storage device (A) 410 is online and that the second local storage device (A) 412 is offline). In another example, the first gate 442 and/or the second gate 444 are configured to block automated synchronization between local storage devices and remote storage devices. For example, an administrator may prefer data within a local storage device over data within a remote storage device, and thus a gate may block automated synchronization that may otherwise automatically overwrite the local storage device with the data from the remote storage device.

Figure 4D:
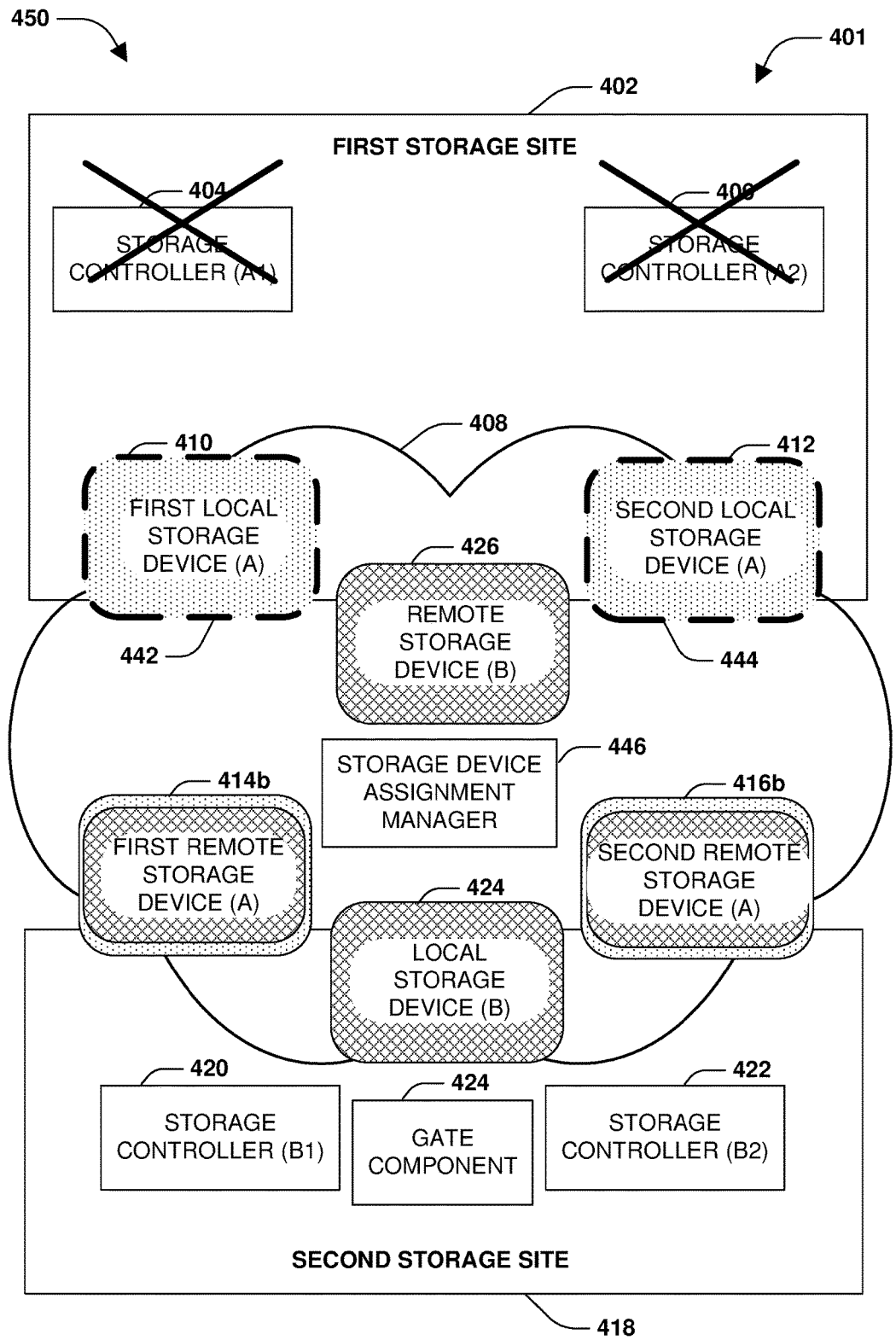
FIG. 4D is an example of restoring a first local storage device (A) and/or a second local storage device (A).

FIG. 4D illustrates an example 450 of restoring the first local storage device (A) 410 and/or the second local storage device (A) 412. The first gate 442 and/or the second gate 444 may block the automated reconstruction and/or the automated synchronization that may otherwise occur for the first local storage device (A) 410 and/or the second local storage device (A) 412 during and/or after the restoration.

Figure 4E:
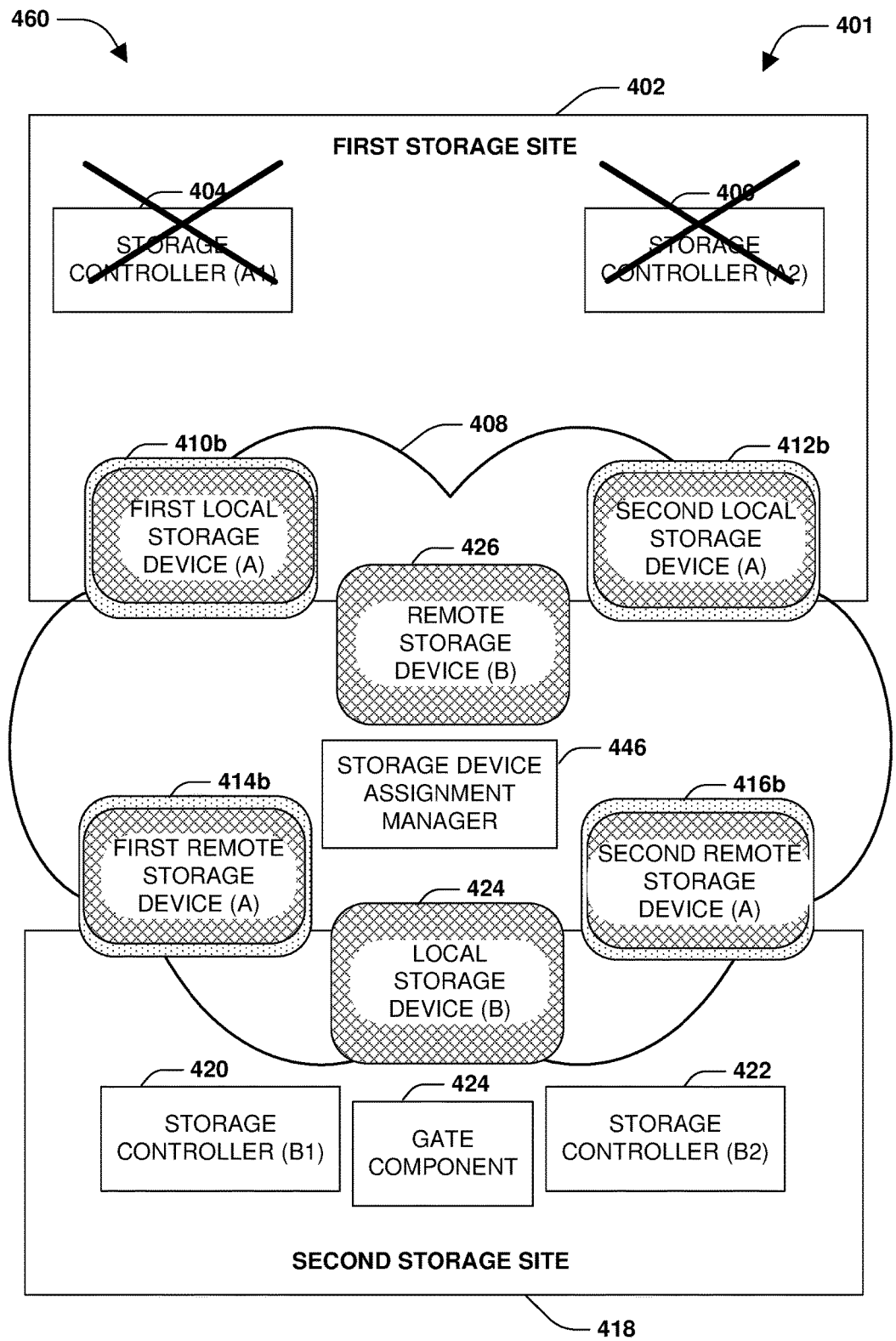
FIG. 4E is an example of a gate component concurrently removing a first gate and a second gate based upon a user restoration command.

A user restoration command may be received. For example, the user restoration command may be received from an administrator that has brought the first local storage device (A) 410 and the second local storage device (A) 412 at the first storage site 402 online. FIG. 4E illustrates an example 460 of the gate component 424 concurrently removing the first gate 442 and the second gate 444 based upon the user restoration command. In an example, the gate component 424 may remove the first gate 442 and/or the second gate 444 by instructing the storage device assignment manager 446 to expose the first local storage device (A) 410 and/or the second local storage device (A) 412 to one or more storage layers. In this way, the first local storage device (A) 410 and the second local storage device (A) 412 are currently brought online, which may mitigate unnecessary automated reconstruction that may otherwise occur if the first local storage device (A) 410 and the second local storage device (A) 412 were brought online in a staggered manner.

The storage controller (B1) 420 and/or the storage controller (B2) 422 acquire ownership of the first local storage device (A) 410 and/or the second local storage device (A) 412. Ownership of the first local storage device (A) 410 is reassigned to the storage controller (B1) 420 resulting in a first local storage device (A) 410b. Ownership of the second local storage device (A) 412 is reassigned to the storage controller (B2) 422 resulting in a second local storage device (A) 412b. Synchronization is facilitated (e.g., by the storage controller (B1) 420 and/or the storage controller (B2) 442) between the first local storage device (A) 410b and the first remote storage device (A) 414b and/or between the second local storage device (A) 412b and the second remote storage device (A) 416b. In an example, the first local storage device (A) 410b is overwritten with data from the first remote storage device (A) 414b. In another example, the first remote storage device (A) 414b is overwritten with data from the first local storage device (A) 410b. In an example, the second local storage device (A) 412b is overwritten with data from the second remote storage device (A) 416b. In another example, the second remote storage device (A) 416b is overwritten with data from the second local storage device (A) 412b.

Figure 4F:
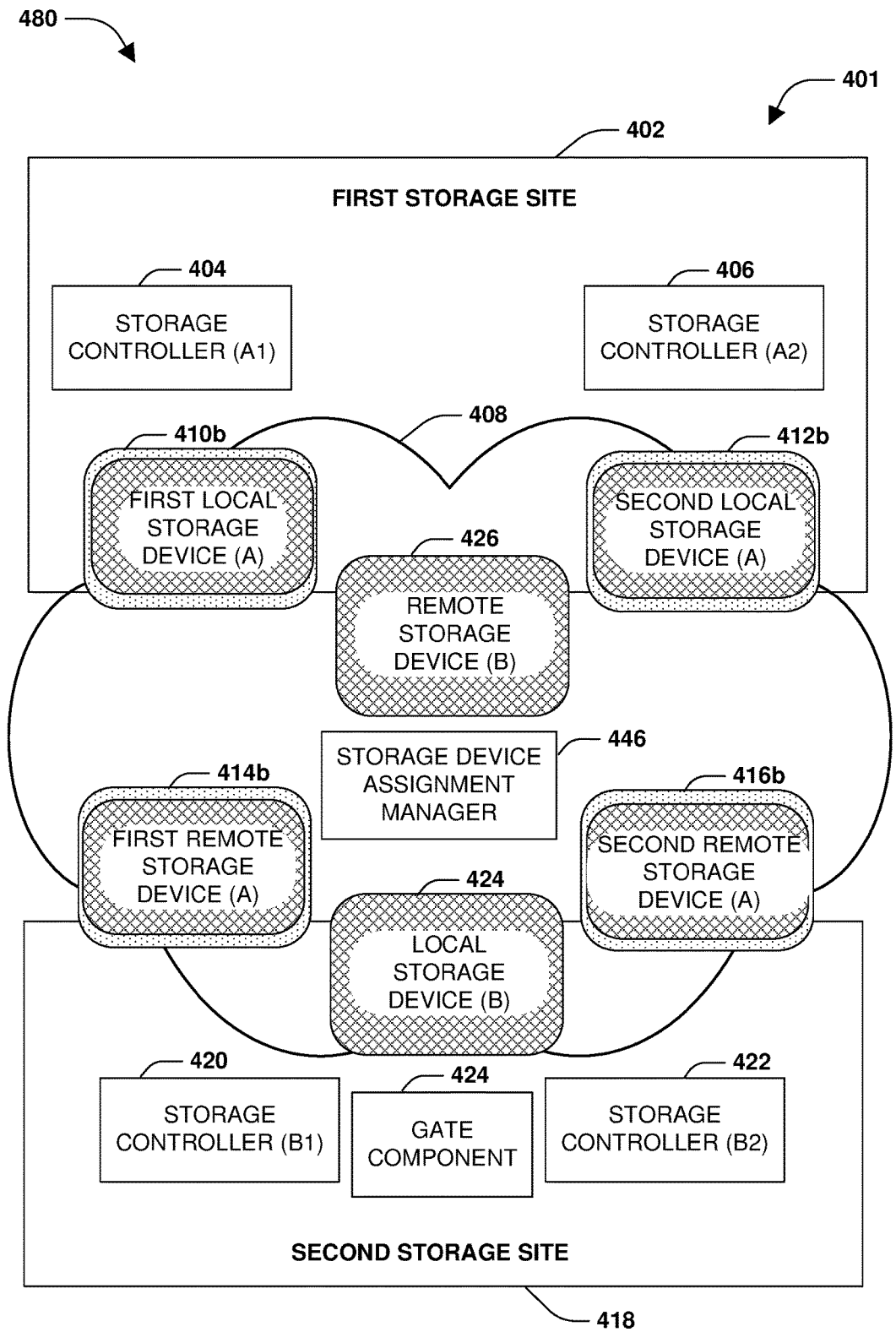
FIG. 4F is an example of restoring a storage controller (A1) and a storage controller (A2) at a first storage site.
Figure 4G:
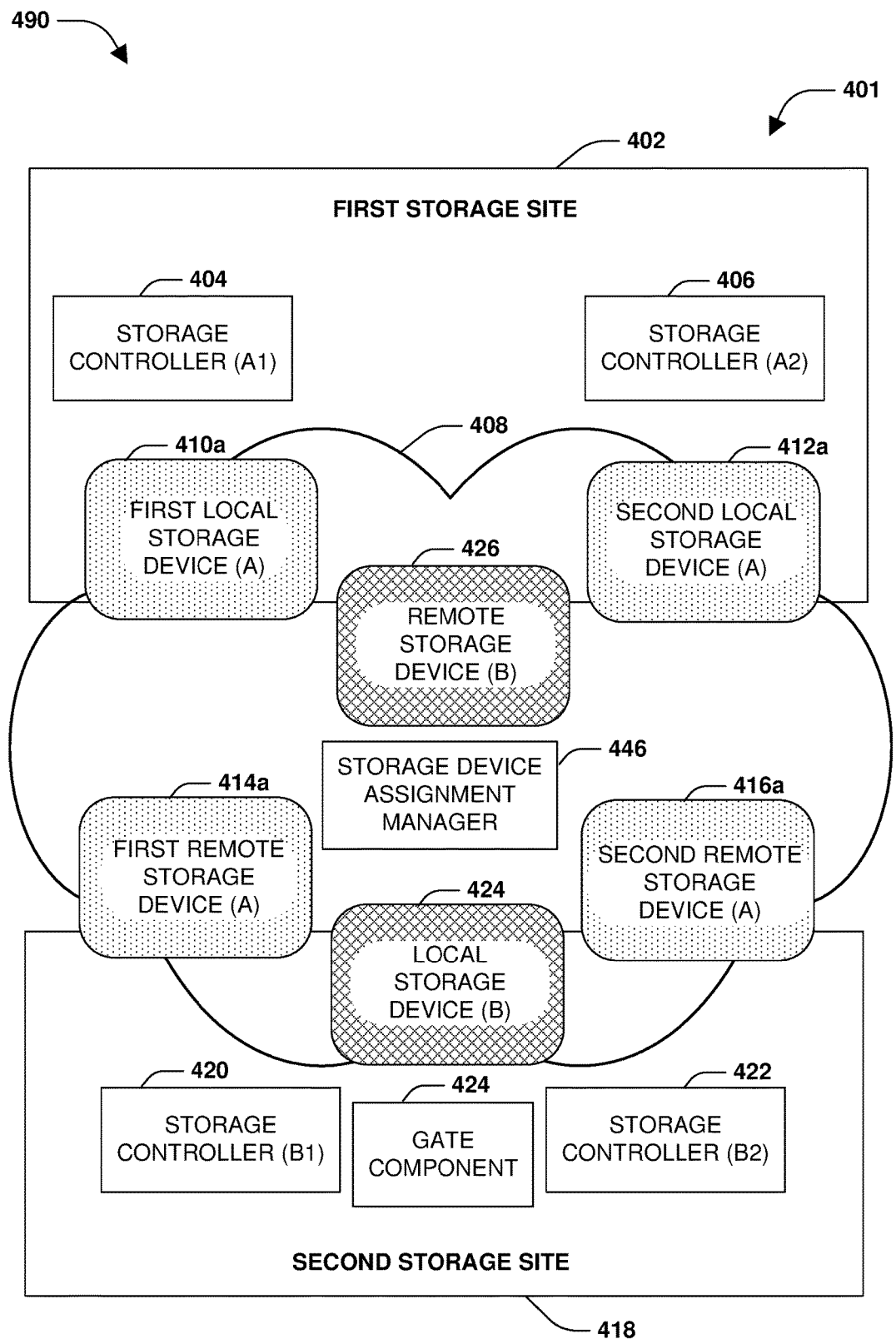
FIG. 4G is an example of reassigning ownership of one or more storage devices.

FIG. 4F illustrates an example 480 of restoring the storage controller (A1) 404 and the storage controller (A2) 406 at the first storage site 402. FIG. 4G illustrates an example 490 of reassigning the one or more storage devices from the second storage site 418 to the first storage site 402. For example, ownership of the first local storage device 410b is reassigned to the storage controller (A1) 404 resulting in a first local storage device 410a. Ownership of the second local storage device 412b is reassigned to the storage controller (A2) 406 resulting in a second local storage device 412a. Ownership of the first remote storage device 414b is reassigned to the storage controller (A1) 404 resulting in a first remote storage device 414a. Ownership of the second remote storage device 416b is reassigned to the storage controller (A2) 406 resulting in a second remote storage device 416a. In this way, the storage controller (A1) 404 and/or the storage controller (A2) 406 of the first storage site 402 may take ownership of and/or provide I/O access to the first local storage device (A) 410a, the second local storage device (A) 412a, the first remote storage device (A) 414a, the second remote storage device (A) 416a and/or other storage devices.

Figure 5:
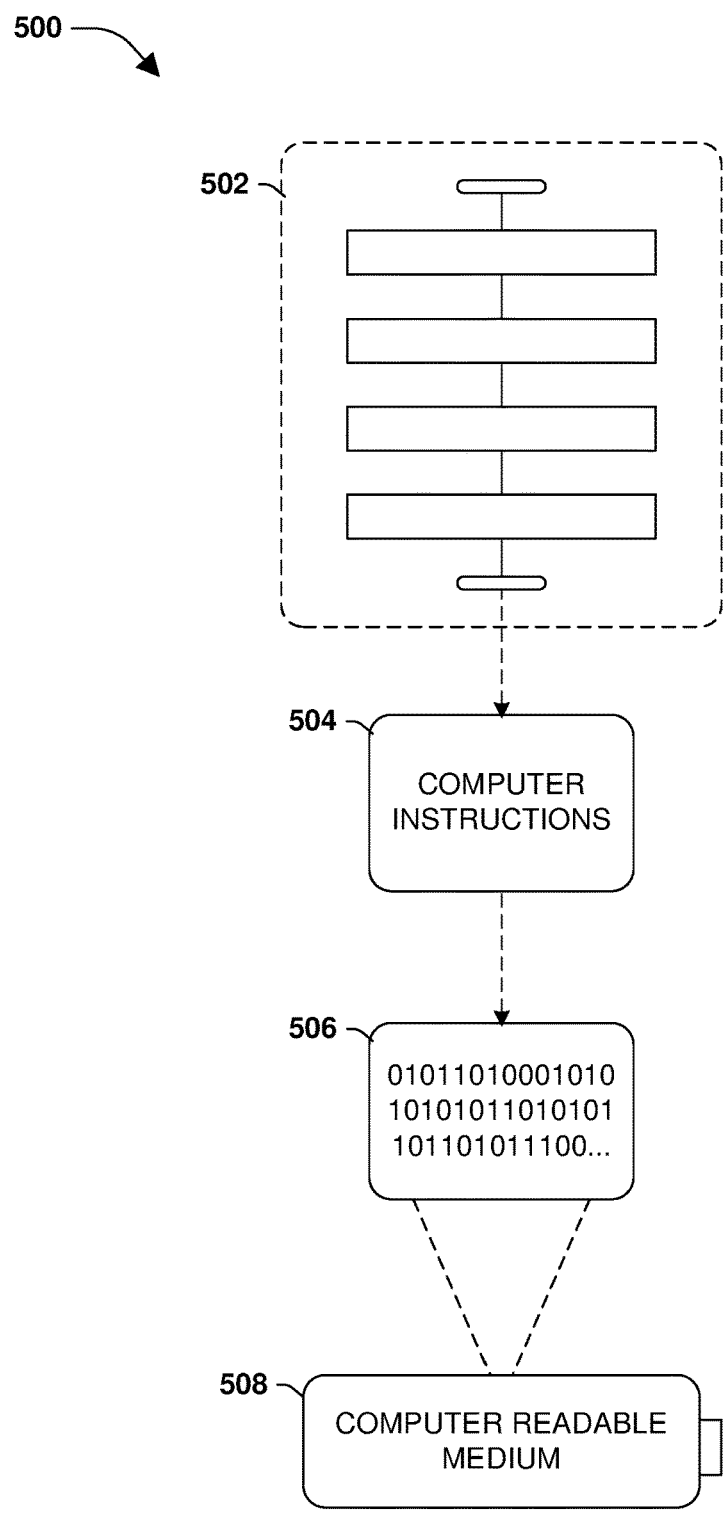
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable instructions 504 are configured to implement a system, such as at least some of the exemplary system 401 of FIGS. 4A-4G, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   reassigning ownership of a second storage device, located at a second storage site, from a first node at a first storage site to a second node at the second storage site based upon a disaster at the first storage site, wherein the second storage device and a first storage device, located at the first storage site, have a data pairing configuration for a first storage aggregate; and
   synchronizing the first and second storage devices by:
      reassigning ownership of the first storage device from the first node to the second node; and
      synchronizing, by the second node as owner of the first and second storage devices, the second storage device using a synchronization template based upon the first storage device being designated as the synchronization template.

2. The method of claim 1, the synchronizing comprising:
   synchronizing the second storage device using data from the first storage device.

3. The method of claim 1, comprising:
   synchronizing the first storage device using the synchronization template based upon the second storage device being designated as the synchronization template.

4. The method of claim 3, the synchronizing the first storage device comprising:
   synchronizing the first storage device using data from the second storage device.

5. The method of claim 1, the synchronizing comprising:
   synchronizing the second storage device using the first storage device based upon user designation that the first storage device is the synchronization template.

6. The method of claim 1, the synchronizing comprising:
   synchronizing the first storage device using the second storage device based upon a user designation that the second storage device is the synchronization template.

7. The method of claim 1, comprising:
   reassigning ownership of the second storage device from the second node to the first node based upon the first storage site recovering from the disaster, wherein the first storage aggregate is restored at the first storage site.

8. The method of claim 7, comprising:
   assigning ownership of the first storage device to the first node.

9. The method of claim 1, the reassigning ownership of the second storage device comprising:
   facilitating data access to the second storage device by the second node.

10. The method of claim 1, the reassigning ownership of the first storage device comprising:
    facilitating data access to the first storage device by the second node.

11. A non-transitory machine readable medium comprising instructions for performing a method, which when executed by a machine, causes the machine to:
    reassign ownership of a second storage device, at a second storage site, from a first node at a first storage site to a second node at the second storage site based upon a disaster at the first storage site, wherein the second storage device and a first storage device, located at the first storage site, have a data pairing configuration for a first storage aggregate; and
    synchronize the first and second storage devices by:
       reassigning ownership of the first storage device from the first node to the second node; and
       synchronizing, by the second node as owner of the first and second storage devices, the second storage device using a synchronization template based upon the first storage device being designated as the synchronization template.

12. The non-transitory machine readable medium of claim 11, wherein the instructions cause the machine to:
    synchronize the second storage device using data from the first storage device.

13. The non-transitory machine readable medium of claim 11, wherein the instructions cause the machine to:
    synchronize the first storage device using the synchronization template based upon the second storage device being designated as the synchronization template.

14. The non-transitory machine readable medium of claim 13, wherein the instructions cause the machine to:
    synchronize the first storage device using data from the second storage device.

15. The non-transitory machine readable medium of claim 11, wherein the instructions cause the machine to:
    synchronize the second storage device using the first storage device based upon user designation of the first storage device as the synchronization template.

16. The non-transitory machine readable medium of claim 11, wherein the instructions cause the machine to:

synchronize the first storage device using the second storage device based upon a user designation of the second storage device as the synchronization template.

17. A computing device comprising:

a memory containing machine readable medium comprising machine executable code having stored thereon instructions for performing a method; and a processor coupled to the memory, the processor configured to execute the machine executable code to cause the processor to:

reassign ownership of a second storage device, at a second storage site, from a first node at a first storage site to a second node at the second storage site based upon a disaster at the first storage site, wherein the second storage device and a first storage device, located at the first storage site, have a data pairing configuration for a first storage aggregate; and synchronize the first and second storage devices by:

reassigning ownership of the first storage device from the first node to the second node; and synchronizing, by the second node as owner of the first and second storage devices, the second storage device using a synchronization template based upon the first storage device being designated as the synchronization template.

18. The computing device of claim 17, wherein the machine executable code causes the processor to:

reassign ownership of the second storage device from the second node to the first node based upon the first storage site recovering from the disaster, wherein the first storage aggregate is restored at the first storage site.

19. The computing device of claim 18, wherein the machine executable code causes the processor to:

assigning ownership of the first storage device to the first node.

20. The computing device of claim 17, wherein the machine executable code causes the processor to:

facilitating data access to the second storage device by the second node.

* * * * *